United States Patent [19]

Newman et al.

[11] Patent Number: 4,486,575
[45] Date of Patent: * Dec. 4, 1984

[54] PROCESS FOR THE MANUFACTURE OF HALOGENATED ELASTOMERS

[75] Inventors: Neil F. Newman, Edison; Ronald C. Kowalski, New Providence, both of N.J.

[73] Assignee: Exxon Research & Engineering Co., Florham Park, N.J.

[*] Notice: The portion of the term of this patent subsequent to May 17, 2000 has been disclaimed.

[21] Appl. No.: 481,369

[22] Filed: Apr. 1, 1983

Related U.S. Application Data

[63] Continuation-in-part of Ser. No. 306,882, Sep. 30, 1981, Pat. No. 4,384,072.

[51] Int. Cl.³ .............................................. C08F 8/22
[52] U.S. Cl. ................................................... 525/356
[58] Field of Search ............... 525/355, 356, 357, 358, 525/359.1, 359.2, 359.3, 359.4, 359.5, 359.6

[56] References Cited

U.S. PATENT DOCUMENTS

| 3,293,226 | 12/1966 | Schrijver | 525/355 |
| 3,966,692 | 6/1976 | Driscoll | 525/356 |
| 4,254,240 | 3/1981 | Newman | 525/355 |

Primary Examiner—Paul R. Michl
Attorney, Agent, or Firm—H. L. Cohen

[57] ABSTRACT

Continuous halogenation of olefinically unsaturated rubber is achieved in an extruder-reactor employing reactants, conditions and design features directed to maximizing mixing and contact of the rubber with the halogenating agent and neutralizing agent while simultaneously minimizing side reactions and polymer degradation. The rubber passes through three extruder-reactor zones under controlled conditions to achieve halogenation: feed, reaction, and neutralization; optionally a wash and exit zone can be utilized. The halogenated rubber, for example, halogenated butyl rubber can be vulcanized in the absence of sulfur, e.g., with zinc oxide and stearic acid, and is useful in all applications where commercially available chlorinated and brominated rubbers are presently employed.

42 Claims, No Drawings

PROCESS FOR THE MANUFACTURE OF HALOGENATED ELASTOMERS

CROSS-REFERENCE TO RELATED APPLICATIONS

This application is a Continuation-in-part of Ser. No. 306,882, filed Sept. 30, 1981, now U.S. Pat. No. 4,384,072.

BACKGROUND OF THE INVENTION

This invention relates to a method of modifying rubber with a halogen or halogens; specifically to a process for the production of halogenated, ethylenically unsaturated rubber. More specifically, it is directed to a continuous process for the manufacture of halogenated elastomers such as butyl ( a copolymer of a major proportion of an isoolefin and a minor proportion of a multiolefin), EPDM (a terpolymer of ethylene, propylene and a nonconjugated diene), SBR (styrene-butadiene rubber), BR (polybutadiene rubber), polyisoprene rubber, etc.

Numerous references teach methods for halogenating various polymers, and more particularly ethylenically unsaturated elastomers. There are, for example, references that teach the halogenation of butyl rubber, but each suffers from serious limitations. An early reference, U.S. Pat. No. 2,944,578, teaches that chlorinated butyl rubber can be produced in a batch process by dissolving butyl rubber in a suitable, nonreactive solvent, e.g., hexane, and introducing chlorine or a chlorinating agent. By suitable control of the temperature, concentrations of chlorinating agent and rubber, and reaction time, chlorinated rubber containing the desired level of chlorine is produced. However, a batch process is inherently inefficient and the need to dissolve the rubber in a solvent incurs significant expenses for solvent recovery and environmental control.

An improved, continuous process for chlorination or bromination of butyl rubber was subsequently disclosed in U.S. Pat. No. 3,099,644. However, that process still required the preparation and use of a solution of butyl rubber, which, in addition to the limitations noted above, is limited as to the concentration of rubber which can be processed, and which requires significant equipment and process control to precipitate the halogenated rubber from solution and then dry the rubber in a controlled manner so as to avoid degradation. The halogenation of ethylenepropylene nonconjugated diene elastomers (EPDM) has also been disclosed; such processes are analogous to those for halogenating butyl rubber. For example, U.S. Pat. No. 4,051,083 describes the solution bromination and chlorination of EPDM using N-halosuccinimide; additionally, the "neat" halogenation of EPDM is also described. In the latter disclosure the halogenating agent is dispersed in the EPDM by blending on a cool rubber mill and halogenation is effected by heating the mixture in a hydraulic press.

Halogenation of EPDM in an aqueous batch process is disclosed in U.S. Pat. No. 3,896,095. The process employs the addition of an excess of $Cl_2$ or $Br_2$ to a polymer slurry to effect halogenation and avoid the expense of solvent recovery systems previously disclosed for solution halogenation processes.

Chlorobromination of polymers such as polybutadiene, butadiene-isoprene copolymers and natural or synthetic polyisoprene is disclosed in British Nos. 1,483,063 and 1,483,064. The reaction is described as taking place at a low temperature of 0°–15° C., preferably in an inert solvent, and the halogenated products are described as containing high levels, e.g., at least 55% by weight of halogen.

A close reading of these references indicates the difficulty with which halogenation of elastomers has been conducted prior to the invention disclosed herein. The various limitations of these batch and continuous solution processes are overcome by the improved process of the present invention.

The possibility of producing a halogenated rubber such as halogenated butyl rubber continuously in an extruder-reactor has been recognized, see, e.g., U.S. Pat. No. 4,185,057. However, the generalized disclosures of that reference do no more than acknowledge the desirability of such a process, but do not teach one how to accomplish such a process. The reference suggests that only enough chlorine be introduced into the extruder to react with the butyl rubber so that no chlorine remains after reaction. It then goes on to suggest that another gas, e.g. nitrogen be introduced to effect the production of gas filled pores in the finished rubber, which is the primary object of the invention.

No examples are disclosed in the patent and no conditions disclosed which would enable one to actually conduct such a butyl halogenation process. The invention disclosed herein provides a teaching sufficient to enable the practice of this unique halogenation process and apply such a teaching to the halogenation of butyl rubber.

Chlorination of butyl rubber using dichloramine-T and a calender has been reported by Bulgarian workers (Kh. Tenchev, et al, Chem Abstracts No. 50756u). The disclosed process was not intended to produce neat chlorinated butyl since calendering is carried out on a mixture of butyl rubber, accelerators, prevulcanization inhibitors as well as variable amounts of carbon black and dichloramine-T.

The halogenation, in a kneader or extruder, of polymers other than butyl rubber using reagents that differ from those disclosed herein is described in U.S. Pat. No. 3,364,187. The polymers containing carboxylic acid groups are converted to the acyl halide derivatives using specific halogenating agents. The patent suggests that the kneading step may be carried out in an extruder, a Banbury mixer, a roll mill or any other apparatus that yields the described kneading action.

A British Patent No. 1,257,016, discloses a process for treating polymers with halogenating agents such as N-bromosuccinimide under mechanical shear for the purpose of producing unsaturation. The patent mentions that halogenation may possibly occur in an intermediate step followed by dehydrohalogenation, but production and isolation of a useful halogenated product is not an objective, nor is it achieved. The process also requires the use of scavenging amounts of a metal oxide or carbonate such as magnesium oxide, zinc oxide or calcium carbonate in addition to the halogenating agent and α-olefin polymer. The patent discloses, as an alternate method, the preblending of the halogenating agent with a solution of the polymer followed by solvent removal. It is stated that very little, if any, reaction occurs during such an operation.

An extensive disclosure of polymer modifications conducted in an extruder can be found in U.S. Pat. No. 3,862,265. This patent is directed to modification of polyolefins using heat, shear and controlled pressure to induce degradation in the polyolefin and to combine the polyolefin with a free-radical initiator and/or one or more monomers. The broad disclosure is of value for its teachings directed to the modification of polyolefins with various monomers especially to form novel grafted polymers.

The particular sensitivity of butyl rubber when exposed to shear and elevated temperatures in the presence of a halogenating agent has made the achievement of a halogenated butyl product using an extruder-reactor a difficult goal, and until the invention disclosed herein, a goal that had not yet been achieved. The halogenation reaction of butyl rubber in solution is described with "Encyclopedia of Chemical Technology," Kirk-Othmer, Third Edition (1979), Volume 8 at page 476 ff. It is noted that the halogenation reaction carried beyond one halogen atom per olefin unit is complicated by chain fragmentation. Indeed, such fragmentation or degradation is a persistent problem when halogenation of butyl rubber is attempted; that problem is aggravated under conditions of heat and shear.

An additional difficulty is the dehydrohalogenation reaction and stabilizers are normally added to solution halogenated butyl to protect against this reaction during processing. It is also necessary to avoid other side reactions such as halogenation of isobutylene residues. Both of the aforementioned reactions are further aspects of the sensitivity of the polymer to the severe halogenation reaction that has made the achievement of controlled halogenation of neat butyl in an extruder-reactor a previously elusive goal.

Conventional processes, i.e., those which halogenate butyl rubber in solution, incur significant disadvantages. These include high capital investment for the equipment needed to handle, purify, and recycle the solvent, high energy costs for the movement, vaporization, and purification and recycle of the solvent, large hydrocarbon emissions to the atmosphere and the use of considerable space for the equipment necessary to handle large volumes of solutions.

SUMMARY OF THE INVENTION

In accordance with the present invention, a process has been discovered for the continuous production of halogenated rubber comprising reacting an olefinically unsaturated rubber and a halogenating agent in an extruder-reactor comprising feed zone (A), reaction zone (B) and neutralization zone (C) in sequence; screw means traversing zones (A) through (C); first flow restriction means following feed zone (A); injection means for supplying halogenating agent to reaction zone (B); mixing means for subjecting rubber in reaction zone (B) to a high degree of mixing; second flow restriction means disposed between reaction zone (B) and neutralization zone (C); and injection means disposed at or adjacent the downstream end of the second flow restriction means for supplying neutralizing agent to the product mixture; which process comprises subjecting rubber in the feed zone to conditions of temperature and pressure sufficient to generate a cohesive mass; conveying the mass past the first restriction means which serves to hinder backflow of halogenating agent, to the reaction zone; halogenating the rubber in the reaction zone by injecting halogenating agent at a position filled with rubber mass and subjecting the reactants to a high degree of mixing; conveying the product mixture past the second restriction means which serves to hinder backflow of neutralizing agent; injecting neutralizing agent at or adjacent the downstream end of the second restriction means; neutralizing the product mixture with the neutralizing agent in the neutralizing zone; and delivering the desired halogenated rubber product from the extruder-reactor. The restriction means can be, for example, a section of screw comprising reverse flights, filled screw, shallow flights, unflighted screw, combinations thereof, or other means known in the art, said restriction means being about 0.5 to about 8 screw diameters in length; the restriction means between the feed and reaction zones can also be a part of or comprise the reaction zone. Such a continuous process eliminates the need for halogenating in solution with its associated problems of handling large volumes of solvent. The products of this process are useful for a wide range of rubber applications including tires, innertubes, mechanical goods, hoses, electrical products, etc. and are, capable of being vulcanized with sulfur-free cure systems, for example, zinc oxide in combination with stearic acid, as well as by standard sulfur and sulfur-donor-containing cure systems.

DESCRIPTION OF THE PREFERRED EMBODIMENTS

Ethylenically unsaturated elastomers useful in the present invention include the several rubbers of commercial significance, for example, butyl rubber, EPDM rubber, styrene butadiene rubber (SBR), polyisoprene rubber including natural rubber, polybutadiene rubber and poly (butadiene-isoprene) copolymer rubbers.

The butyl rubber copolymers useful in the present invention contains a major proportion, preferably at least 70 wt. percent, of isoolefins and a minor proportion, preferably not more than about 30 wt. percent, of multiolefins. Copolymers of this general type, especially where the copolymer contains about 85–99.5% (preferably 95–99.5%) of a $C_4$–$C_7$ isoolefin, such as isobutylene, with about 15–0.5% (preferably about 5–0.5 wt. percent) of a multiolefin of about 4–14 carbon atoms, are commonly referred to in patents and literature as "butyl rubber"; see, for example, the textbook "Synthetic Rubber" by G. S. Whitby (1954 edition by John Wiley and Sons, Inc.), pages 608–609, Encyclopedia of Chemical Technology, third edition, Vol. 8, 1979, pages 470–484, etc. The expression "butyl rubber" as employed in the specification and claims is intended to include copolymers containing about 80–99% by weight of an isoolefin of about 4–7 carbon atoms and about 20–1% of conjugated multiolefin of about 4–10 carbon atoms. The preparation of butyl-type rubbers is amply described in the literature. In general, it consists of the reaction product of a $C_4$–$C_7$ isoolefin (preferably isobutylene) with a $C_4$–$C_{10}$ (preferably a $C_4$–$C_6$ conjugated diolefin, such as isoprene, butadiene, dimethyl butadiene, piperylene, etc. The reaction product of isobutylene and isoprene is preferred. The preparation of butyl rubber is described in U.S. Pat. No. 2,356,128 which is incorporated herein by reference.

Conventional high molecular weight butyl rubber generally has a number average molecular weight of about 25,000 to about 500,000, preferably about 80,000 to about 300,000, especially about 100,000 to about 250,000; and a Wijs Iodine No. of about 0.5 to 50, preferably 1 to 20. More recently low molecular weight polymers have also been prepared which have number average molecular weights of from 5,000 to 25,000 and unsaturation expressed as mole %, of 2–10.

The term "EPDM" as used in the specification and claims is used in the sense of its ASTM definition and is intended to mean a terpolymer containing ethylene and propylene in the backbone and diene enchainment with residual unsaturation in the sidechains. Illustrative methods for producing these terpolymers are found in U.S. Pat. No. 3,280,082, British Pat. No. 1,030,989 and French Pat. No. 1,386,600 which are incorporated herein by reference.

The preferred polymers contain about 45 to about 80 wt. % ethylene and about 1 to about 10 wt. % diene monomer. The balance of the polymer is propylene. Preferably, the polymer contains 45 to 70 wt. % ethylene, most preferably 50 to 60 wt. % ethylene, e.g., 56 wt. %, and about 2 to about 9 wt. % diene monomer, more preferably about 2 to about 6 wt. % diene monomer, most preferably 2.6 to 4 wt. % diene monomer. The diene monomer is a non-conjugated diene. Illustrative of these nonconjugated diene monomers which may be used in the terpolymer (EPDM) are hexadiene, dicyclopentadiene, ethylidene norbornene, methylene norbornene, propylidene norbornene and methyltetrahydroindene. A typical EPDM containing ethylidene norbornene as a diene monomer is Vistalon 4608 (Exxon Chemical Company, U.S.A.), a polymer having a Mooney Viscosity at 260° F. of about 62, and an ethylene content of about 56 wt. %

The polyisoprene rubber referred to in this invention may be natural rubber or synthetic polyisoprene prepared by processes well known in the art, and in general, has a molecular weight of from about 500 to about 500,000, preferably about 1500 to about 200,000.

The polybutadiene and poly(butadiene-isoprene) copolymer rubbers referred to in this invention include the geometric isomers thereof, all of which may be prepared by processes well known in the art. In general, such polymers and copolymers have a molecular weight of from about 500 to about 500,000, preferably from about 1500 to about 200,000. Generally polybutadiene rubbers have Mooney viscosity values, measured at 212° F., of from about 25 to about 65, preferably from about 35 to about 55, most preferably from about 40 to about 50.

The styrene butadiene rubber referred to in this invention is also known as poly(butadiene-co-styrene), and typically abbreviated SBR, and includes rubbers prepared by the emulsion (hot and cold) and solution processes well known in the art. Bound styrene levels are from about 3 to about 50 weight %, preferably from about 10 to about 45 weight %, most preferably from about 12 to about 30 weight %, for example, 23.5 weight %. Generally, such polymers have Mooney viscosity values, measured at 212° F., of from about 20 to 130 and above, preferably from about 35 to about 80, most preferably from about 40 to about 70, for example 52.

The butadiene in such copolymers is present as all three geometric isomers, cis-1,4, trans-1,4 and 1,2 or vinyl and the copolymer can be random, block or graft.

The elastomers or rubbers referred to above and processes for their preparation are generally described in the Kirk-Othmer Encyclopedia of Chemical Technology, 3d. Edition, 1979, Volume 8: butyl p. 470ff, EPDM p. 492ff, polybutadiene p. 546ff, polyisoprene p. 582ff and poly (butadiene-co-styrene) p. 608ff, incorporated herein by reference.

Some forms of halogenated butyl rubber, prepared in solution according to processes described above, are commercially available, e.g., chlorinated butyl rubber and brominated butyl rubber. One method used to prepare halogenated butyl rubber is that of halogenating butyl rubber in a solution (butyl rubber cement) containing between 1 to 60% by weight of butyl rubber in a substantially inert $C_5$-$C_8$ hydrocarbon solvent such as pentane, hexane, heptane, etc. and contacting this butyl rubber cement with a halogen for a period of up to about 25 minutes. There is then formed the halogenated butyl rubber and a hydrogen halide, the polymer containing up to one or somewhat more halogen atoms per double bond initially present in the polymer. Generally, halogenated butyl rubber comprises a copolymer of 85 to 99.5 weight percent of a $C_4$ to $C_8$ isoolefin, e.g., isobutylene, with 15 to 0.5 weight percent of a $C_4$ to $C_{14}$ multiolefin, e.g., isoprene, containing at least about 0.5 weight percent combined halogen in its structure. For example, where butyl is halogenated with bromine, the bromine can be present in the brominated butyl in an amount of from about 1.0 to about 3.0 weight percent, preferably from about 1.5 to about 2.5 weight percent. A method of preparing conventionally halogenated butyl rubber is described in U.S. Pat. No. 3,099,644, which is incorporated herein by reference.

The preparation, in solution, of halogenated butyl rubber containing both bromine and chlorine, i.e., bromochlorinated butyl rubber, is described in U.S. Pat. No. 4,254,240, incorporated herein by reference. The potential for molecular weight breakdown of the butyl rubber, noted earlier, is present even where bromine chloride is used as the halogenating agent, as disclosed in this reference (col. 4, lines 24–32).

The heart of the process disclosed and claimed herein centers around the extruder-reactor. The extruder-reactor may be thought of as carrying out the halogenated rubber manufacture in three operating zones which are:

(A) Feed zone—in which rubber is introduced into the extruder-reactor in convenient form. This form includes, for example, particles from bales of rubber which have been comminuted and crumb from the finishing line of a rubber manufacturing plant, each of which can be dry or may contain a low level of water, e.g., about 0 to 15 wt. %, preferably about 0 to 5 wt. %, most preferably about 0 to 1 wt. %, or another solvent or diluent; the latter materials will be described more fully below.

The feed zone is designed to form the rubber feed into a cohesive mass and convey or pump the rubber mass past a restrictive dam which follows the feed zone and distinguishes it from the reaction zone which follows. This operation should be conducted at low shear and temperature consistent with the desired result and at a pressure sufficient to convey the rubber mass, typically up to about 600 psig, preferably up to about 400 psig, most preferably up to about 200 psig. Lower pressures are preferred in order to avoid overheating the rubber. This can be achieved, e.g., by utilizing an extruder screw with relatively deep flights and by keeping the length of the feed zone, i.e., the feed zone screw length, as short as possible commensurate with desired production rates. For example, rubber is introduced at about room temperature and exits at about 60° to 150° C.

A restrictive dam is used to separate the feed zone from the reaction zone which follows it so as to prevent back leakage of reactants. This dam is not restrictive enough, however, to cause excessive overheating of the rubber. A restrictive dam can be, for example, a reverse flighted screw section, a filled screw section, a shallow flighted screw section, an unflighted screw section, combinations thereof, or other means known in the art. If an unflighted screw section is employed, it can have a larger diameter than the root diameter upstream of it, for example 5–25% larger, but not greater than the screw flight diameter. The restrictive dam length should be about 0.5 to about 8 screw diameters, preferably about 1 to about 5 screw diameters, more preferably about 1.5 to about 4 screw diameters, most preferably about 2 to about 3 screw diameters in length. If a reverse flighted screw section is employed it can be single or multiflighted, preferably multiflighted.

It should be noted that where the restrictive dam configuration employed is more than a mere separation boundary or region between zones, for example more than merely an unflighted screw section, the restrictive dam can be considered to be part of the reaction zone itself, for example when a single or multiflighted reverse flighted screw section is employed. Under such circumstances, the restrictive dam in this region of the extruder-reactor can be a part of or comprise the reaction zone.

In addition to the rubber which is introduced into the feed zone, an optional diluent may also be added. A diluent can function to reduce the viscosity of the rubber to a level commensurate with subsequent good mixing and halogenation without the necessity for excessive heat and a risk of molecular weight breakdown and undesirable side reactions; it can also function to reduce the temperature of the rubber. The diluent may be volatile sautrated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the rubber in the reaction zone. Examples of suitable materials include water, inert gases such as nitrogen and argon, and soluble gases such as carbon dioxide and air.

The diluent may also be retained with or in the rubber, such as a hydrocarbon oil. Suitable oils include saturated aliphatic oil and rubber process oils such as paraffinic, naphthenic and aromatic types. Where such oils are utilized, the halogenated rubber would contain oil after recovery and drying and would commonly be referred to as "oil extended". Oil extended rubber is well known in the art and various grades of oil extended EPDM, SBR and polybutadiene made by other means are commercially available. Such products are particularly useful where it is desirable, for example, to extend the rubber with high levels of filler, e.g., carbon black or mineral filler, to obtain properties from high molecular weight rubber which might otherwise be difficult to process because of its inherently high viscosity, etc.

The total amount of diluent, including that which may be present in the feed should not be greater than about 50 weight percent based on the rubber, preferably less than about 15 weight percent, most preferably about 5 to about 10 weight percent.

(B) Reaction zone—can generally be described as the zone in which the halogenating agent is caused to react with the rubber to completely effect the halogenation reaction while simultaneously minimizing undesired side reactions. Screw configuration in the reaction zone is important to mixing efficiency and achievement of the overall objectives of the process. The configuration should be such as to cause disruption of the flow of rubber, as, for example, by the aforementioned use of reverse flights, multiple reverse flights, pin sections, a series of very short alternating reverse and forward screw sections, and other designs known in the art to improve mixing. Viscosity control of the rubber, effected, in part, by the use of an optional diluent and by control of the molecular weight of the rubber and the rubber temperature as it enters the reaction zone, also determines, to a large extent, mixing efficiency. Selection of the temperature level influences the reaction and along with residence time in the reaction zone, the nature of the end product. For maximum economy and continuity of production the choice of materials of construction of the reaction zone is particularly important; this also influences the type and level of potential contaminants in the finished rubber and their influence on long term storage stability of the rubber as well as chemical reactivity. This is discussed in further detail later in this disclosure.

The process should preferably halogenate the rubber to the extent of about one halogen atom per double bond of olefinic unsaturation originally present in the rubber. Control is required in order to avoid over and under halogenation. This can be achieved by, for example, controlling the halogen feed rate in comparison to the rubber feed rate, design of the reaction zone (length, screw features and configuration, injection means, temperature, etc.) and RPM so as to determine time of reaction and to control the relative rates of the desired reaction versus competing side reactions (e.g., halogenation of the olefinic unsaturation as for example the isoprene moiety in butyl versus the isobutylene moiety). Additionally, design of the neutralization zone to effect rapid and complete neutralization is also important in controlling the extent of halogenation.

The halogenating agent can be gaseous, liquid or solid and may be added either in a pure state or diluted with a suitable inert fluid as noted above. Suitable halogenating agents include chlorine, sulfuryl chloride, N-chlorosuccinimide, 1,3-dichloro-5,5-dimethylhydantoin iodobenzene dichloride, iodine monochloride, bromine, bromine chloride, sodium hypobromite, sulfur bromide and N-bromosuccinimide. Where gaseous chlorine, bromine or bromine chloride is used, gaseous diluents, e.g. nitrogen, argon, air, $CO_2$, etc., can be used when a diluent is desired.

At least under some conditions encountered in extruder halogenation, as, for example, where mixing butyl rubber and the halogenation agent are not as efficient as desired, the use of N-chlorosuccinimide may result in predominantly free-radical reactions rather than the preferred ionic reactions.

In order to achieve the nearly instantaneous mixing of halogenating agent with rubber, it is important that the point of injection of the halogenating agent be filled with rubber. However, configuration of the screw and chamber walls should not be so restrictive as to cause excessive pressure and excessive shear heating of the rubber. Suitable pressure at the point of injection would be about 15 to about 400 psig, preferably about 100 to about 300 psig, most preferably about 150 to about 200 psig.

Also important for achieving rapid and complete reaction of the rubber and halogenating agent is the incorporation in the reaction zone of means to produce a high degree of rubber mixing. This can be achieved, for example, by utilizing reverse flights on the reaction zone portion of the extruder screw, utilizing pins, operating the screw at a high rotation rate, about 100 to about 600 RPM, preferably about 150 to about 450 RPM, most preferably about 200 to about 400 RPM, and by incorporating a downstream restrictive dam, of the type described above, to separate the reaction zone from the neutralization zone which follows it.

Overall, it is desirable, by control of rubber viscosity, chamber and screw design, screw RPM, and operating pressure to prevent excessive temperatures in the reaction zone while maintaining a high level of mixing. It is desirable that a temperature of less than about 170° C. be achieved, preferably less than about 140° C., most preferably less than about 120° C.

(C) Neutralization zone—in which byproduct HCl and/or HBr is neutralized to prevent dehydrohalogenation of the halogenated rubber and to suppress corrosion of the equipment. Suitable reagents to effect neutralization and deactivate any residual unreacted halogenating reagent include aqueous bases such as hydroxides, carbonates or bicarbonates of alkali or alkaline earth metals, for example, sodium, calcium and potassium hydroxide and potassium carbonate; a preferred reagent is a solution of sodium hydroxide.

The neutralization zone is designed so that neutralizing agents contact the reaction products from the reaction zone as soon as possible after the halogenation reaction in order to prevent dehydrohalogenation of the rubber. This is achieved by utilizing a dam between the reaction and neutralization zones which is as short as possible consistent with its functioning as a restrictive dam. The nature and configuration of various alternatives for the restrictive dam are described above in detail for the dam between the feed and reaction zones. In addition, the injection port for the neutralizing reagent is located as close as possible to the downstream end of the dam.

(D) Wash zone—To achieve a halogenated rubber end product not containing usually undesirable materials the neutralized halogenated rubber is subjected to washing. In a particularly preferred embodiment such washing is performed within the extruder-reactor in a wash zone (D) which sequentially follows neutralization zone (C) and which is traversed be the extruder screw means. Thus in the wash zone a stream or several streams of water are run through countercurrent and/or concurrent to the flow of neutralized rubber so as to remove fluid and soluble non-polymer-bound materials, except water, from the rubber; some water may remain occluded in the rubber. Additionally, rubber particles may also be dispersed in a continuous water phase.

In addition to introducing water into this zone to effect a washing of the halogenated rubber reaction product, rubber stabilizing agents can optionally be added in this zone. This can be done by incorporating the stabilizers into the water wash stream or by adding an injection point to the final exit zone specifically for this purpose.

(E) Exit zone—Preferably the extruder-reactor comprises a final exit zone (E) in which the temperature of the halogenated rubber product is adjusted for delivery therefrom at a temperature below about 130° C., more preferably below about 120° C. and most preferably below about 100° C., as a contribution to the stability of the rubber. Also in the exit zone, stabilizer(s) may initially be added to the washed, halogenated rubber product if not added in the wash zone or additional stabilizer(s) can be added following the wash zone.

Suitable stabilizers for use in this process include slurries or solutions of butylated hydroxytoluene (BHT), calcium stearate, sodium stearate, multicomponent stabilization systems such as those described in U.S. Pat. No. 4,130,519 to Roper et al, incorporated herein by reference, and other degradation, oxidation and/or dehydrohalogenation inhibitors.

In addition to the extruder-reactor features just described, the process of this invention can also incorporate filter means known in the art to effect the separation of low-viscosity wastes from the rubber stream while retaining the rubber in the extruder, screw means of suitable configuration, as described above, transversing zones (A)–(E) inclusive to properly effect the operations disclosed in said zones (including single and twin screws), a system for recycling any organic diluent that may be added to the feed zone and/or included with the halogenating agent and, optionally, means for back-mixing the extruded halogenated rubber to assure that the final, dried and packaged rubber is a homogeneous product.

Materials of construction are a significant consideration in the process herein since potentially corrosive reagents are employed. In addition to a concern for long equipment life, product stability needs to be considered if by-products of the corrosion process become incorporated into the rubber. In addition, halogenation chemistry can be affected if metals and corrosion by-products are present during the halogenation reaction. Materials of construction in the feed zone, reaction zone and neutralization zone are selected to prevent or minimize reaction of the equipment with the halogenating agent and reaction byproducts. Small amounts of such reactions may cause undesirable side reactions to occur with various constituents in the rubber, e.g., isobutylene moieties in butyl. Useful materials include those alloys known commercially as Hastelloy, steels coated with inert polymers such as fluorocarbons, ceramics, etc. Materials which have been found to be unsatisfactory include series 300 stainless steels, Monel, and carbon steel.

Following preparation of the halogenated rubber product in the extruder-reactor, the wet product is transferred to conventional rubber processing equipment for further drying and packaging. This equipment includes rubber mills, dewatering and drying extruders of various kinds, balers, etc.

The halogenated rubber of this invention can be processed in standard rubber equipment such as internal mixers, mills, extruders, calenders, etc. at the normally elevated temperatures of use for such equipment. Said rubber is amenable to conventional rubber compounding practice and various fillers and extenders can be incorporated in said rubber, e.g., various carbon blacks, clays, silicas, carbonates, oils, resins, waxes, etc.

The halogenated rubber of this invention may be cured or vulcanized by any of the prior art methods suitable for such halogenated rubbers, e.g., halogenated butyl rubber can be cured using sulfur, sulfur-containing curing agents (such as sulfenamide derivatives, benzothiazyl disulfide, tetramethylthiouram disulfide, alkyl phenol disulfide, etc.), zinc oxide alone or with various promoters, and mixtures thereof. Curing is usually accomplished at a temperature of from about 140° C. to about 250° C., preferably 150° C. to about 200° C., and usually takes from 1 to 150 minutes.

This inveniton will be further understood by reference to the following examples which describe a process demonstrating the principles of this invention.

EXAMPLE 1

A dual-worm extruder of 0.8" screw diameter was set up in the configuration described above with the omission of the optional diluent stream; stabilizer was not added to the rubber in the extruder. Diluent, a saturated aliphatic oil, was, however, incorporated to the extent of 15 parts per hundred of rubber (phr) in the feed butyl. The butyl feed contained 1.8 mole percent isoprene. The halogenating agent was 50% sulfuryl chloride in carbon tetrachloride. Aqueous sodium hydroxide and water were added as the neutralization and wash streams respectively and wastes were removed from the wash zone. A restrictive dam between the feed zone and reaction zone was 0.61 inches in diameter and the same size dam was used between the reaction zone and neutralization zone. In addition, the latter dam was 1.2 inches in length. The pressure at the halogenating agent injection point ranged from about 45 psig to about 100 psig. To achieve a high rate of rubber turnover in the reaction zone a screw speed of about 300 RPM was used in combination with reverse flighted screws in the reaction zone. The halogenated product, obtained as an extrudate, was worked up by acetone precipitation to remove the diluent oil, stabilization with about 0.5 weight % calcium stearate, steam stripping and drying on a mill at about 125° C.

The presence of the desired chlorinated butyl structure in the halogenated product was demonstrated by (1) The observation of an absorption in the infrared spectrum at about 1635 cm$^{-1}$, indicative of exo-methylene unsaturation, and (2) the generation of cure when vulcanized with zinc oxide/stearic acid, a system which cures chlorinated butyl but does not cure unchlorinated butyl.

When compounded with 50 phr of GPF carbon black, 5 phr of zinc oxide, and 1 phr of stearic acid and cured in a Monsanto rheometer for 60 min. at 150° C., an increase in torque above the minimum of 5 lb-in was observed. This may be compared to an increase in torque of 32 lb-in observed for commercial chlorinated butyl made by solution chlorination when similarly compounded and cured, and to a change in torque of 0 lb-in for unchlorinated butyl rubber,

EXAMPLE 2

A dual-worm extruder was set up in the manner described in Example 1. The halogenating agent was a 5% solution of chlorine in carbon tetrachloride.

The presence of the desired chlorinated butyl structure was again demonstrated by: (1) An infrared absorption at 1635 cm$^{-1}$ and, (2) the generation of cure when compounded and cured, as described in Example 1, with zinc oxide and stearic acid; a torque increase of 4 lb-in was observed for the chlorinated butyl prepared with $Cl_2/CCl_4$ as halogenating agent.

EXAMPLE 3

(a) A batchwise simulation of the reaction and neutralization zones of the extruder-reactor was conducted using a kneader-reactor. The one used was made by C. W. Brabender and had 60 cc capacity. This reactor constructed of the alloy Hastelloy C, was charged with 35 g of butyl rubber (having $\overline{M}_v = 557,000$ and 2.2 mole % unsaturation). The rubber temperature and the temperature during chlorination, was raised to 80° C. by kneading at 80 rpm while cooking the reactor jacket with chilled water. Chlorine gas at 5 psig was injected into the kneader for 5 minutes at 0.425 g/min. Following the chlorination period, the reactor was purged by injecting nitrogen gas at 5 psig for 30 sec. at 1.25 g/min.

Any residual excess chlorine and byproduct HCl was neutralized by flowing a stream of 5% aqueous solution of sodium hydroxide into the reactor for 5 minutes at 40 g/min.

The wet product was removed from the kneader-reactor and converted to stable dry rubber by well known means, i.e., the rubber was put into solution in hexane, washed with water, stabilized with 0.5% of calcium stearate, steam stripped and dried on a rubber mill at 125° C. for 7 minutes.

The product rubber contained 1.32% chlorine, had a $\overline{M}_v$ of 411,000, and gave an infrared spectrum showing the exo-methylene absorption at 1635 cm$^{-1}$ characteristic of conventional chlorinated butyl rubber when compounded and cured as described in Example 1, except 30 min. cure at 160° C., a torque increase of 22 lb-in was observed.

(b) An experiment was carried out similar to that in 3a above, except that the chlorinating agent was a gaseous mixture of 10 volume % chlorine and 90 vol. % nitrogen. This mixture was injected into the kneader-reactor at 5 psig for 10 minutes at 0.425 g of $Cl_2$/min.

The product rubber from the experiment contained 0.74% chlorine, and also gave an infrared absorption at 1635 cm$^{-1}$ characteristic of conventional chlorinated butyl rubber. When compounded and cured as described in Example 3a, a torque increase of 12.0 lb.in was obtained.

What we claim is:

1. A process for the continuous production of halogenated rubber by reacting an olefinically unsaturated rubber and a halogenating agent in an extruder-reactor, said extruder-reactor comprising feed zone (A), reaction zone (B) and neutralization zone (C) in sequence; screw means traversing zones (A) through (C); first flow restriction means following feed zone (A); injection means for supplying halogenating agent to reaction zone (B); mixing means for subjecting rubber in reaction zone (B) to a high degree of mixing; second flow restriction means disposed between reaction zone (B) and neutralization zone (C); and injection means disposed at or adjacent the downstream end of the second flow restriction means for supplying neutralizing agent to the product mixture; further comprising subjecting rubber in the feed zone to conditions of temperature and pressure sufficient to generate a cohesive mass; conveying said mass past said first restriction means to said reaction zone; halogenating the rubber in said reaction zone by injecting halogenating agent at a position filled with said rubber and subjecting the reactants to a high degree of mixing; conveying the product mixture past said second restriction means; injecting neutralizing agent at or adjacent the downstream end of said second restriction means; neutralizing said product mixture with said neutralizing agent in said neutralizing zone; and delivering said halogenated rubber product from the extruder-reactor 2. The process of claim 1 wherein said olefinically unsaturated rubber is selected from the group consisting of butyl rubber, EPDM rubber, styrene butadiene rubber, polyisoprene rubber, polybutadiene rubber, and poly(butadiene-isoprene) copolymer rubber.

3. The process of claim 2 wherein said rubber is butyl rubber.

4. The process of claim 2 wherein said rubber is EPDM rubber.

5. The process of claim 1 wherein said halogenating agent is selected from the group consisting of chlorine gas, aqueous chlorine, sulfuryl chloride, N-Chloro-succinimide, 1,3-dichloro-5,5-dimethylhydantoin iodobenzene dichloride, iodine monochloride, bromine gas, bromine liquid, bromine chloride, sodium hypobromite, sulfur bromide and N-bromosuccinimide.

6. The process of claim 3 wherein said butyl rubber is isobutylene-isoprene copolymer.

7. The process of claim 1, further comprising adding a diluent to said rubber feed before, at or near the point of addition of said feed.

8. The process of claim 7 wherein said diluent is selected from the group consisting of volatile saturated hydrocarbons chlorohydrocarbons, chlorocarbons, non-hydrocarbons, and hydrocarbon oils.

9. The process of claim 8 wherein said diluent is selected from the group consisting of pentane, hexane, methylene chloride, chloroform, carbon tetrachloride, carbon dioxide, inert gas and water.

10. The process of 9 wherein said diluent is present at less than about 50 percent by weight based on the weight of rubber.

11. The process of claim 5 wherein said halogenating agent is selected from the group consisting of bromine, chlorine and bromine chloride.

12. The process of claim 5 wherein said halogenating agent is diluted with diluent.

13. The process of claim 12 wherein said halogenating agent is chlorine.

14. The process of claim 12 wherein said diluent is a gas selected from the group consisting of nitrogen, argon, air and $CO_2$.

15. The process of claim 7 wherein said halogenating agent is diluted with a diluent and wherein the total amount of diluent added to said feed and halogenating agent diluent is less than about 50 percent by weight based on the weight of butyl rubber.

16. The process of claim 15 wherein said diluent added to said feed is selected from the group consisting of volatile saturated hydrocarbons, chlorohydrocarbons, chlorocarbons and hydrocarbon oils.

17. The process of claim 1 wherein said neutralizing agent is an aqueous base, said aqueous based selected from the group consisting of hydroxide, bicarbonates and carbonates of alkali and alkaline earth metals.

18. The process of claim 1 further comprising the step of washing said neutralized product mixture.

19. The process of claim 18 wherein the washing step is performed in an extruder wash zone (D) which follows the neutralization zone (C), prior to delivering the halogenated rubber product from the exit of the extruder.

20. The process of claim 1 further comprising a final exit zone (E).

21. The process of claim 18 wherein washing is performed by means of one or more streams of water directed countercurrent to and/or concurrent with the flow of neutralized halogenated rubber to remove therefrom fluid and non-polymer-bound materials other than water.

22. The process of claim 20 wherein the temperature of said halogenated rubber is adjusted for delivery from said exit zone at a temperature lower than about 130° C.

23. The process of claim 18 wherein a degradation, oxidation or dehydrohalogenation stabilizer is added in said wash step.

24. The process of claim 20 wherein a degradation, oxidation or dehydrohalogenation stabilizer is added to said exit zone.

25. The process of claim 19 wherein said extruder-reactor further comprises filter means to effect the separation of non-polymer-bound materials from said halogenated rubber.

26. The process of claim 1 wherein said restriction means following said feed zone is selected from the group consisting of a reverse flighted screw section, a filled screw section, a shallow flighted screw section, and an unflighted screw section.

27. The process of claim 26 wherein said restriction means is about 0.5 to about 8 screw diameters in length.

28. The process of claim 1 wherein said restriction means following said feed zone comprises said reaction zone.

29. The process of claim 1 wherein said means for producing a high degree of rubber mixing is selected from the group consisting of a reverse flighted screw section, a multiple reverse flighted screw section, a pin section, and a series of very short alternating reverse and forward screw sections.

30. The process of claim 1 wherein said restriction means separating said neutralization zone from, said reaction zone is selected from the group consisting of a reverse flighted screw section, a filled screw section, a shallow flighted screw section, and an unflighted screw section.

31. The process of claim 6 wherein the temperature in said reaction zone is less than about 170° C.

32. The process of claim 26 wherein said restriction means is an unflighted screw section with a diameter of from 5 to 25 percent larger than the root diameter of the upstream screw section, but not greater than the upstream screw flight diameter.

33. The process of claim 30 wherein said restriction means is an unflighted screw section with a diameter of from 5 to 25 percent larger than the root diameter of the upstream screw section, but not greater than the upstream screw flight diameter.

34. The process of claim 7 wherein said diluent is a hydrocarbon oil.

35. The process of claim 1 wherein said extruder screw means is a twin screw.

36. The process of claim 1 wherein said extruder screw means is a single screw.

37. The process of claim 12 wherein said halogenating agent is bromine.

38. The process of claim 12 wherein said halogenating agent is bromine chloride.

39. The process of claim 1 wherein a high degree of mixing is achieved in said reaction zone by operating the extruder screw at a rotation rate of from 100 to 600 RPM.

40. The process of claim 1 wherein the material used in the construction of one or more of said zones is selected from the group consisting of a Hastelloy alloy, steel coated with inert polymer or a ceramic.

41. The process of claim 1 wherein the rubber in the feed zone is subjected to a pressure of up to about 600 psig.

42. The process of claim 1 wherein, at the position of injection of the halogenating agent into the reaction zone, the rubber mass is at a pressure of from about 15 to about 400 psig.

* * * * *